United States Patent [19]
Behrens

[11] Patent Number: 5,835,295
[45] Date of Patent: Nov. 10, 1998

[54] ZERO PHASE RESTART INTERPOLATED TIMING RECOVERY IN A SAMPLED AMPLITUDE READ CHANNEL

[75] Inventor: Richard T. Behrens, Louisville, Colo.

[73] Assignee: Cirrus Logice, Inc., Fremont, Calif.

[21] Appl. No.: 751,880

[22] Filed: Nov. 18, 1996

[51] Int. Cl.⁶ .................................................. G11B 5/09
[52] U.S. Cl. ............................................ 360/51; 375/341
[58] Field of Search .................................. 360/46, 51, 65; 375/230, 262, 341, 340, 242, 376; 369/48, 59

[56] References Cited

U.S. PATENT DOCUMENTS

| | | | |
|---|---|---|---|
| 5,481,568 | 1/1996 | Yada | 375/340 |
| 5,552,942 | 9/1996 | Ziperovich et al. | 360/51 |
| 5,563,746 | 10/1996 | Bliss | 360/53 |
| 5,696,639 | 12/1997 | Spurbeck et al. | 360/51 |
| 5,726,818 | 3/1998 | Reed et al. | 360/51 |

OTHER PUBLICATIONS

"Interpolation in Digital Modems—Part II: Implementation and Performance", IEEE, Erup et al, 1993.

Sonntag, Agazzi, Aziz, Burger, Comino, Heimann, Karanink, Khoury, Madine, Nagaraj, Offord, Peruzzi, Plany, Rao, Sayiner, Setty, Threadgill, "A High Speed, Low Power PRML Read Channel Device", IEEE Transactions on Magnetics, vol. 31, No. 2, Mar. 1995.

*Primary Examiner*—Aristotelis M. Psitos
*Assistant Examiner*—Regina Y. Neal
*Attorney, Agent, or Firm*—Howard H. Sheerin; Dan A. Shifrin

[57] ABSTRACT

A sampled amplitude read channel is disclosed for disc storage systems which asynchronously samples an analog read signal, equalizes the resulting discrete time sample values according to a target partial response, extracts synchronous sample values through interpolated timing recovery, and detects digital data from the synchronous sample values using a Viterbi sequence detector. The interpolated timing recovery comprises a zero phase restart circuit for minimizing an intial phase error between expected sample values and interpolated sample values at the beginning of an acquisition mode by computing an initial sampling phase offset.

15 Claims, 11 Drawing Sheets

ZERO PHASE RESTART INTERPOLATED TIMING RECOVERY IN A SAMPLED AMPLITUDE READ CHANNEL

FIELD OF INVENTION

The present invention relates to the control of disc storage systems for digital computers, particularly to a zero phase restart technique for computing an initial interpolation interval at the beginning of an acquisition mode, the interpolation interval for use in interpolated timing recovery in a sampled amplitude read channel.

CROSS REFERENCE TO RELATED APPLICATIONS AND PATENTS

This application is related to other co-pending U.S. patent applications, namely application Ser. No. 08/640,351 entitled "Adaptive Equalization and Interpolated Timing Recovery in a Sampled Amplitude Read Channel for Magnetic Recording."

BACKGROUND OF THE INVENTION

Computer storage systems (such as optical, magnetic, and the like) record digital data onto the surface of a storage medium, which is typically in the form of a rotating magnetic or optical disc, by altering a surface characteristic of the disc. The digital data serves to modulate the operation of a write transducer (write head) which records binary sequences onto the disc in radially concentric or spiral tracks. In magnetic recording systems, for example, the digital data modulates the current in a write coil in order to record a series of magnetic flux transitions onto the surface of a magnetizable disc. And in optical recording systems, for example, the digital data may modulate the intensity of a laser beam in order to record a series of "pits" onto the surface of an optical disc. When reading this recorded data, a read transducer (read head), positioned in close proximity to the rotating disc, detects the alterations on the medium and generates a sequence of corresponding pulses in an analog read signal. These pulses are then detected and decoded by read channel circuitry in order to reproduce the digital sequence.

Detecting and decoding the pulses into a digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to channel noise. Consequently, discrete time sequence detectors increase the capacity and reliability of the storage system. There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, analog circuitry, responsive to threshold crossing or derivative information, detects peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the concentric data tracks in the effort to increase data density, detection errors can also occur due to intersymbol interference, a distortion in the read signal caused by closely spaced overlapping pulses. This interference can cause a peak to shift out of its bit cell, or its magnitude to decrease, resulting in a detection error. The ISI effect is reduced by decreasing the data density or by employing an encoding scheme that ensures a minimum number of "0" bits occur between "1" bits. For example, a (d,k) run length limited (RLL) code constrains to d the minimum number of "0" bits between "1" bits, and to k the maximum number of consecutive "0" bits. A typical (1,7) RLL 2/3 rate code encodes 8 bit data words into 12 bit codewords to satisfy the (1,7) constraint.

Sampled amplitude detection, such as partial response (PR) with Viterbi detection, allows for increased data density by compensating for intersymbol interference and the effect of channel noise. Unlike conventional peak detection systems, sampled amplitude recording detects digital data by interpreting, at discrete time instances, the actual value of the pulse data. To this end, the read channel comprises a sampling device for sampling the analog read signal, and a timing recovery circuit for synchronizing the samples to the baud rate (code bit rate). Before sampling the pulses, a variable gain amplifier adjusts the read signal's amplitude to a nominal value, and a low pass analog filter filters the read signal to attenuate aliasing noise. After sampling, a digital equalizer filter equalizes the sample values according to a desired partial response, and a discrete time sequence detector, such as a Viterbi detector, interprets the equalized sample values in context to determine a most likely sequence for the digital data (i.e., maximum likelihood sequence detection (MLSD)). MLSD takes into account the effect of ISI and channel noise in the detection algorithm, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp. 921–934, September 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp. 38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid disc Drive", *IEEE Trans. on Magnetics*, Vol. 27, No. 6, November 1991; and Carley et al, "Adaptive Continuous-Time Equalization Followed By FDTS/DF Sequence Detection", *Digest of The Magnetic Recording Conference*, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, September 1994; and Abbott et al, "Timing Recovery For Adaptive Decision Feedback Equalization of The Magnetic Storage Channel", *Globecom'90 IEEE Global Telecommunications Conference* 1990, San Diego, Calif., November 1990, pp. 1794–1799; and Abbott et al, "Performance of Digital Magnetic Recording with Equalization and Offtrack Interference", *IEEE Transactions on Magnetics*, Vol. 27, No. 1, January 1991; and Cioffi et al, "Adaptive Equalization in Magnetic-disc Storage Channels", *IEEE Communication Magazine*, February 1990; and Roger Wood, "Enhanced Decision Feedback Equalization", *Intermag'90*.

Similar to conventional peak detection systems, sampled amplitude detection requires timing recovery in order to correctly extract the digital sequence. Rather than process the continuous signal to align peaks to the center of bit cell periods as in peak detection systems, sampled amplitude systems synchronize the pulse samples to the baud rate. In conventional sampled amplitude read channels, timing recovery synchronizes a sampling clock by minimizing an error between the signal sample values and estimated sample values. A pulse detector or slicer determines the estimated sample values from the read signal samples. Even in the presence of ISI the sample values can be estimated and, together with the signal sample values, used to generate synchronous samples through a decision-directed feedback system.

A phase-locked-loop (PLL) normally implements the timing recovery decision-directed feedback system. The PLL comprises a phase detector for generating a phase error based on the difference between the estimated samples and the read signal samples. A PLL loop filter filters the phase error, and the filtered phase error operates to synchronize the channel samples to the baud rate.

Conventionally, the PLL phase error adjusts the frequency of a sampling clock which is typically the output of a variable frequency oscillator (VFO). The output of the VFO controls a sampling device, such as an analog-to-digital (A/D) converter, to synchronize the sampling to the baud rate. An alternative to sampling synchronously is to sample asynchronously and interpolate to the synchronous sample values (i.e., interpolated timing recovery) in which case the phase error is used to compute an interpolation interval. The interpolation interval is the phase offset between the asynchronous sample values and synchronous sample values.

Whether timing recovery is implemented by sampling synchronously or through interpolation, it is desirable to minimize the initial phase error between the estimated sample value and the read signal sample value (or interpolated sample value) at the beginning of the acquisition mode. (As described below, in acquisition mode the read channel attempts to synchronize to the correct frequency and phase by reading an acquisition preamble recorded on the disc immediately preceding the user data.) If sampling synchronously, a zero phase restart circuit minimizes the initial phase error by detecting a zero crossing, and then delaying the sampling VFO for half a sample period. Obviously the zero phase restart technique for synchronous sampling will not work in read channels employing interpolated timing recovery.

Thus, there is a need for a zero phase restart circuit in a sampled amplitude read channel employing interpolated timing recovery.

SUMMARY OF THE INVENTION

A sampled amplitude read channel is disclosed for disc storage systems which asynchronously samples an analog read signal, equalizes the resulting discrete time sample values according to a target partial response, extracts synchronous sample values through interpolated timing recovery, and detects digital data from the synchronous sample values using a Viterbi sequence detector. The interpolated timing recovery comprises a zero phase restart circuit for minimizing an intial phase error between expected sample values and interpolated sample values at the beginning of an acquisition mode by computing an initial sampling phase offset.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Conventional Sampled Amplitude Read Channel

Figure 1:
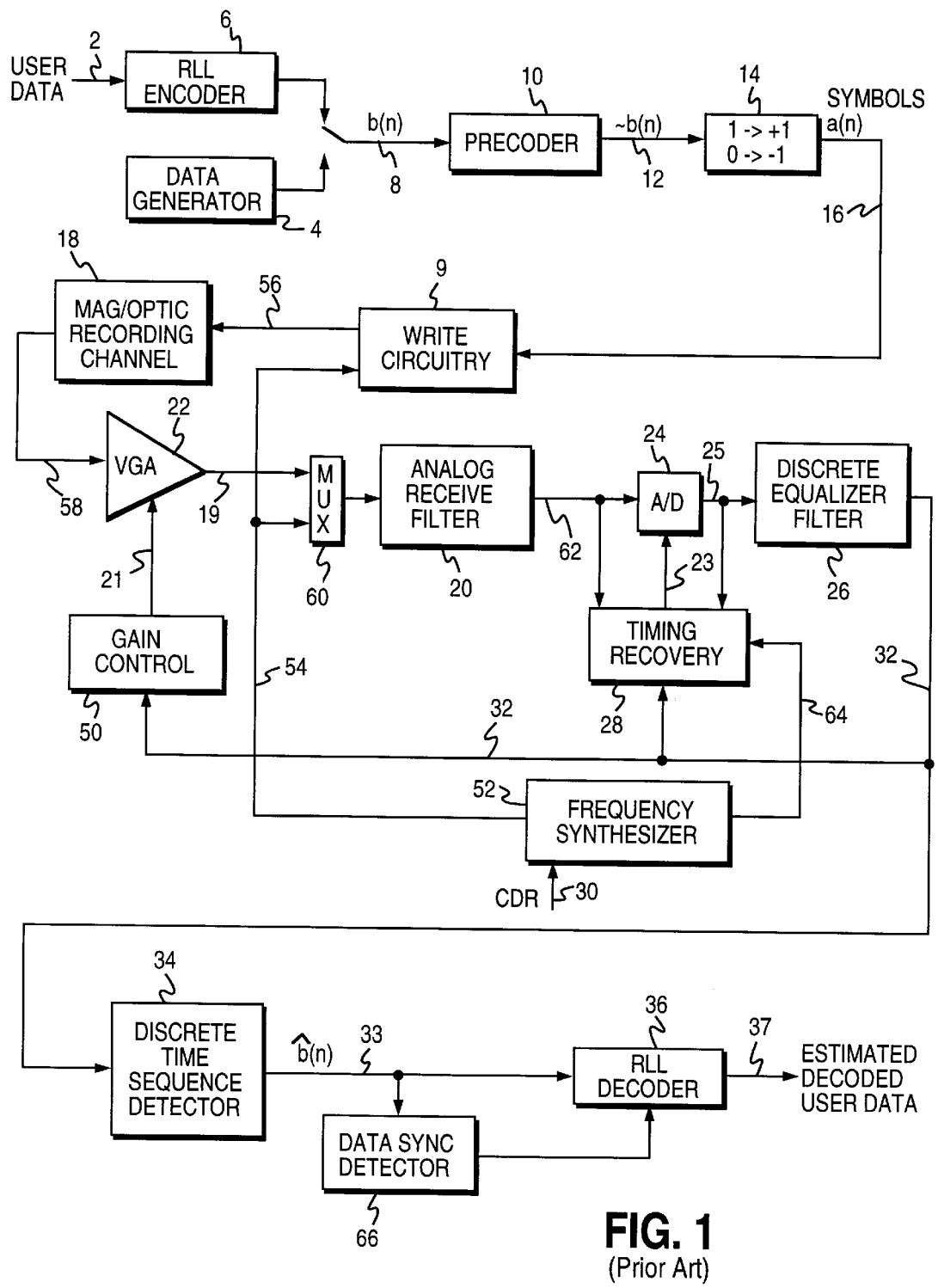
FIG. 1 is a block diagram of a conventional sampled amplitude recording channel.

Referring now to FIG. 1, shown is a detailed block diagram of a conventional sampled amplitude read channel. During a write operation, either user data 2 or preamble data from a data generator 4 (for example 2T preamble data) is written onto the media. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizer filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil at the baud rate 1/T to record the binary sequence onto the media. A frequency synthesizer 52 provides a baud rate write clock 54 to the write circuitry 9 and is adjusted by a channel data rate signal (CDR) 30 according to the zone the recording head is over.

When reading the recorded binary sequence from the media, timing recovery 28 first locks to the write frequency by selecting, as the input to the read channel, the write clock 54 through a multiplexor 60. Once locked to the write frequency, the multiplexor 60 selects the signal 19 from the read head as the input to the read channel in order to acquire an acquisition preamble recorded on the disc preceding the recorded user data. A variable gain amplifier 22 adjusts the amplitude of the analog read signal 58, and an analog filter 20 provides initial equalization toward the desired response as well as attenuating aliasing noise. A sampling device 24 samples the analog read signal 62 from the analog filter 20, and a discrete time equalizer filter 26 provides further equalization of the sample values 25 toward the desired response. In partial response recording, for example, the desired response is often selected from Table 1:

TABLE 1

| Channel | Transfer Function | Dipulse Response |
| --- | --- | --- |
| PR4 | $(1 - D)(1 + D)$ | 0, 1, 0, −1, 0, 0, 0, . . . |
| EPR4 | $(1 - D)(1 + D)^2$ | 0, 1, 1, −1, −1, 0, 0, . . . |
| EEPR4 | $(1 - D)(1 + D)^3$ | 0, 1, 2, 0, −2, −1, 0, . . . |

After equalization, the equalized sample values 32 are applied to a decision directed gain control 50 and timing recovery 28 circuit for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a course center frequency setting to the timing recovery circuit 28 over line 64 in order to center the timing recovery frequency over temperature, voltage, and process variations. The channel data rate (CDR) 30 signal adjusts a frequency range of the synthesizer 52 according to the data rate for the current zone. Gain control 50 adjusts the gain of variable gain amplifier 22 over line 21 in order to match the magnitude of the channel's frequency response to the desired partial response.

The equalized samples 32 are also input into a discrete time sequence detector 34, such as a maximum likelihood (ML) Viterbi sequence detector, which detects an estimated binary sequence ^b(n) 33 from the sample values. An RLL decoder 36 decodes the estimated binary sequence ^b(n) 33 from the sequence detector 34 into estimated user data 37. A data sync detector 66 detects the sync mark 70 (shown in FIG. 2B) in the data sector 15 in order to frame operation of the RLL decoder 36. In the absence of errors, the estimated binary sequence ^b(n) 33 matches the recorded binary sequence b(n) 8, and the decoded user data 37 matches the recorded user data 2.

Data Format

Figure 2A:
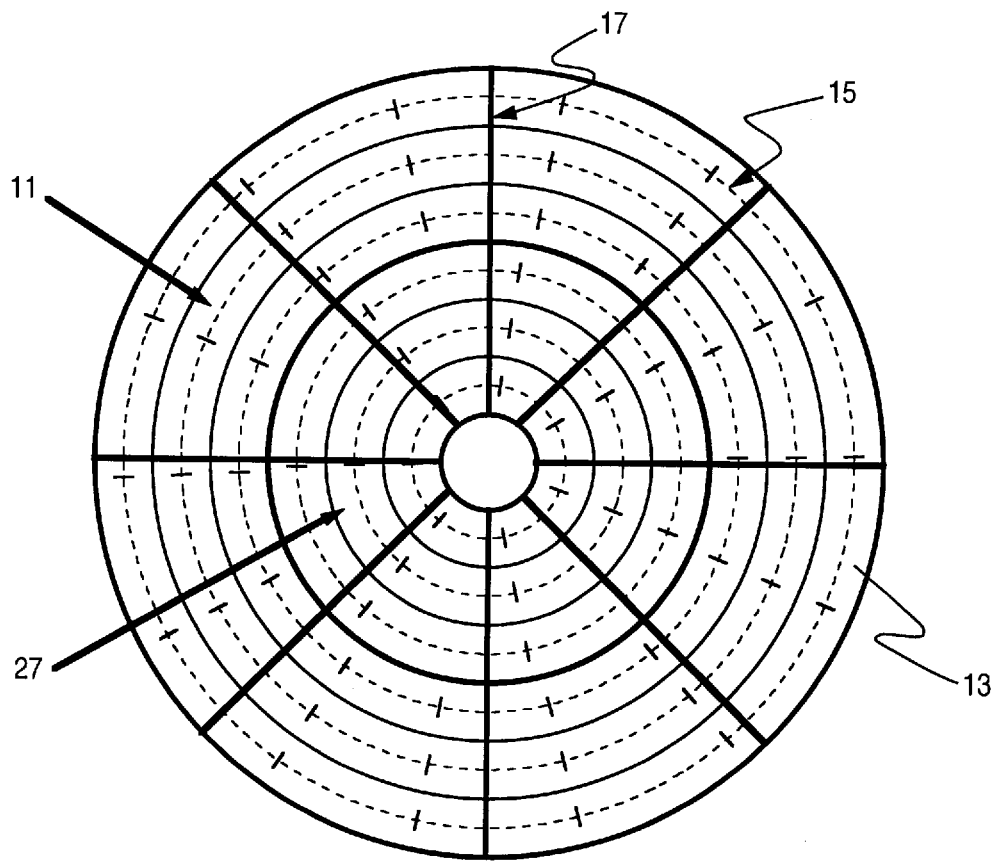
FIG. 2A shows an exemplary data format of a magnetic disc having a plurality of concentric tracks comprised of a plurality of user data sectors and embedded servo data sectors.

FIG. 2A shows an exemplary data format of a magnetic disc medium comprising a series of concentric data tracks 13 wherein each data track 13 comprises a plurality of sectors 15 with embedded servo wedges 17. A servo controller (not shown) processes the servo data in the servo wedges 17 and, in response thereto, positions the read/write head over a desired track. Additionally, the servo controller processes servo bursts within the servo wedges 17 to keep the head aligned over a centerline of the desired track while writing and reading data (i.e., while "tracking" the data). The servo wedges 17 may be detected by a simple discrete time pulse detector or by the discrete time sequence detector 34. The format of the servo wedges 17 includes a preamble and a sync mark, similar to the user data sectors 15.

Figure 2B:
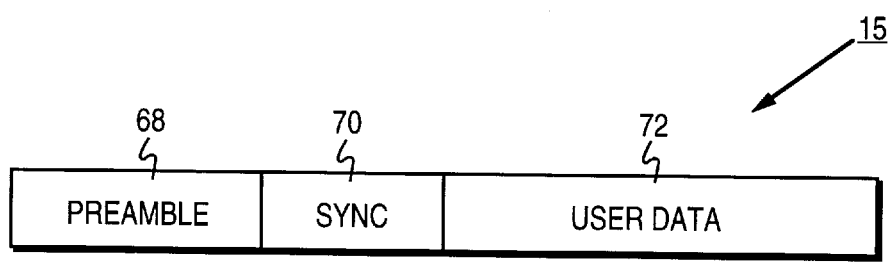
FIG. 2B shows an exemplary format of a user data sector.

FIG. 2B shows the format of a user data sector 15 comprising an acquisition preamble 68, a sync mark 70, and user data 72. Timing recovery processes the acquisition preamble 68 to acquire the correct sampling frequency and phase before reading the user data 72, and the sync mark 70 demarks the beginning of the user data 72 (see co-pending U.S. Pat. No. 5,754,352 entitled "Synchronous, Read Channel Employing an Expected Sample Value Generator For Requiring A Preamble").

To increase the overall storage density, the disc is partitioned into an outer zone 11 comprising fourteen data sectors per track, and an inner zone 27 comprising seven data sectors per track. In practice, the disc is actually partitioned into several zones with a different number of sectors in each zone, and the data recorded and detected at a different data rate in each zone.

Improved Sampled Amplitude Read Channel

Figure 3:
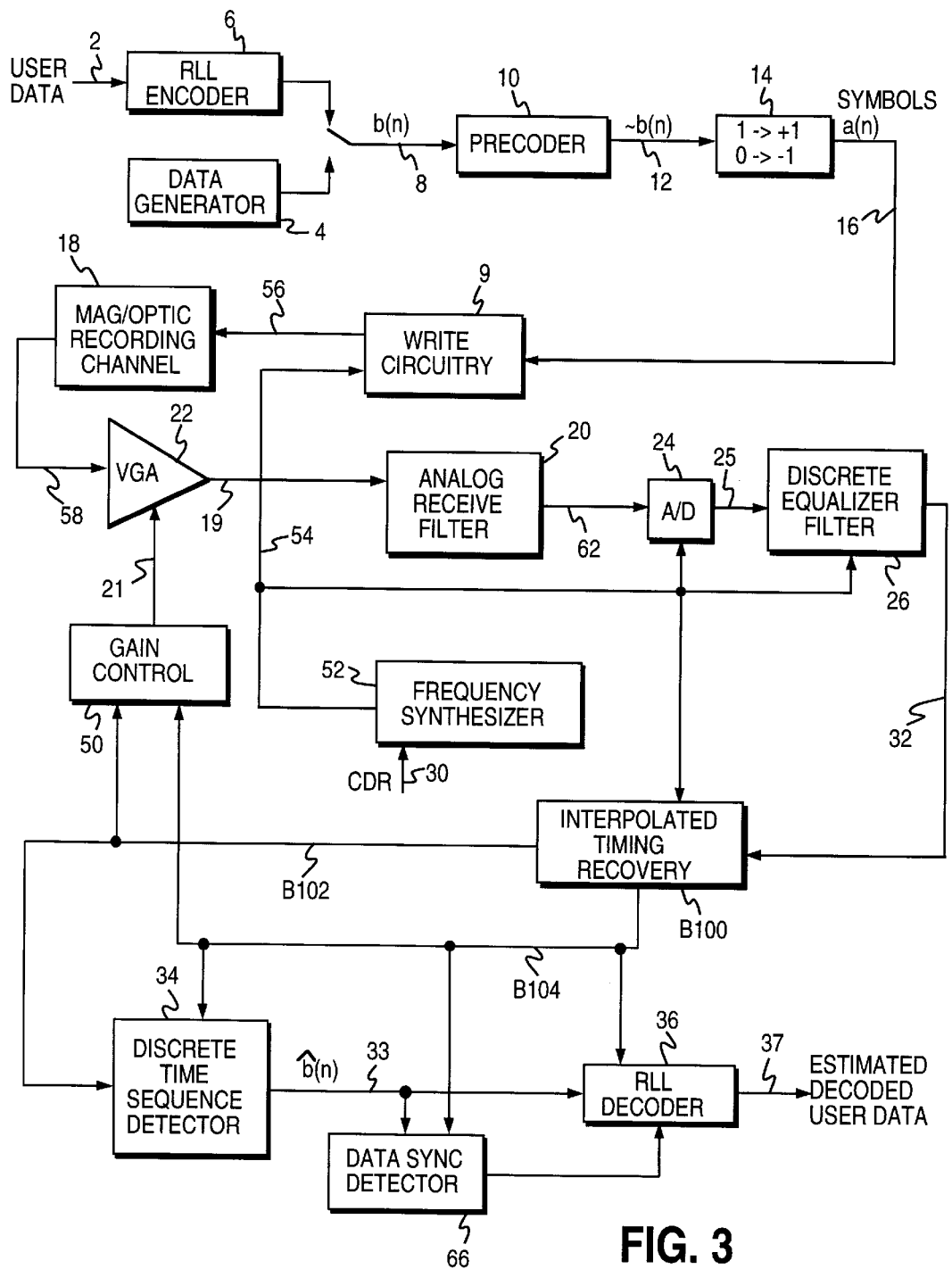
FIG. 3 is a block diagram of the improved sampled amplitude read channel of the present invention comprising asynchronous sampling and interpolated timing recovery.

FIG. 3 shows the improved sampled amplitude read channel of the present invention wherein the conventional sampled timing recovery 28 of FIG. 1 has been replaced by interpolated timing recovery (ITR) B100. In addition, the write frequency synthesizer 52 generates a baud rate write clock 54 applied to the write circuitry 9, and an asynchronous read clock 54 for clocking the sampling device 24, the discrete time equalizer filter 26, and the ITR B100 at a frequency relative to the current zone (CDR 30). In an alternative embodiment, a first frequency synthesizer generates the write clock, and a second frequency synthesizer generates the read clock.

To facilitate ITR B100, the A/D 24 samples the read signal 62 asynchronously to generate a sequence of asynchronous sample values 25. The asynchronous samples 25 are equalized 26 and the equalized sample values 32 input into ITR B100 which generates interpolated sample values B102 substantially synchronized to the baud rate. A discrete time sequence detector 34 detects an estimated binary sequence 33 representing the user data from the interpolated sample values B102, and ITR B100 generates a synchronous data clock B104 for clocking the discrete time detector 34, gain control 50, sync mark detector 66, and RLL decoder 36.

Conventional Timing Recovery

Figure 4A:
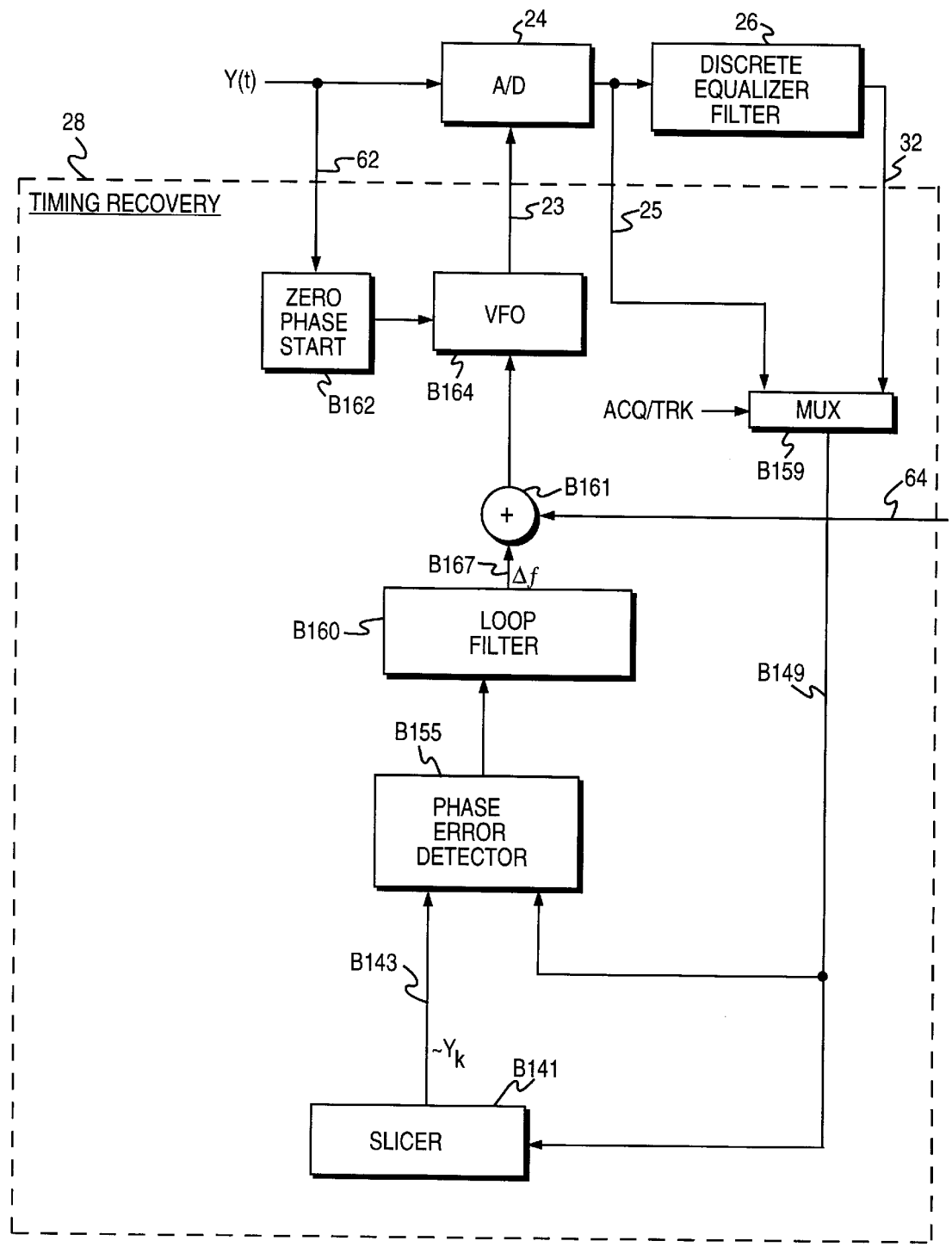
FIG. 4A is a detailed block diagram of the prior art sampling timing recovery comprising a sampling VFO.

An overview of the conventional sampling timing recovery circuit 28 of FIG. 1 is shown in FIG. 4A. The output 23 of a variable frequency oscillator (VFO) B164 controls the sampling clock of a sampling device 24 which is typically an analog-to-digital converter (A/D) in digital read channels. A multiplexor B159 selects the unequalized sample values 25 during acquisition and the equalized sample values 32 during tracking, thereby removing the discrete equalizer filter 26 from the timing loop during acquisition in order to avoid its associated latency. A phase error detector B155 generates a phase error in response to the sample values received over line B149 and estimated sample values ~$Y_k$ from a sample value estimator B141, such as a slicer in a d=0 PR4 read channel, over line B143. A loop filter B160 filters the phase error to generate a frequency offset Δf B167 that settles to a value proportional to a frequency difference between the sampling clock 23 and the baud rate. The frequency offset Δf B167, together with the center frequency control signal 64 from the frequency synthesizer 52, adjust the sampling clock 23 at the output of the VFO B164 in order to synchronize the sampling to the baud rate.

A zero phase restart (ZPR) B162 circuit suspends operation of the VFO B164 at the beginning of acquisition in order to minimize the initial phase error between the sampling clock 23 and the read signal 62. This is achieved by disabling the VFO B164, detecting a zero crossing in the analog read signal 62, and re-enabling the VFO B164 after a predetermined delay between the detected zero crossing and the first baud rate sample.

Interpolated Timing Recovery

Figure 4B:
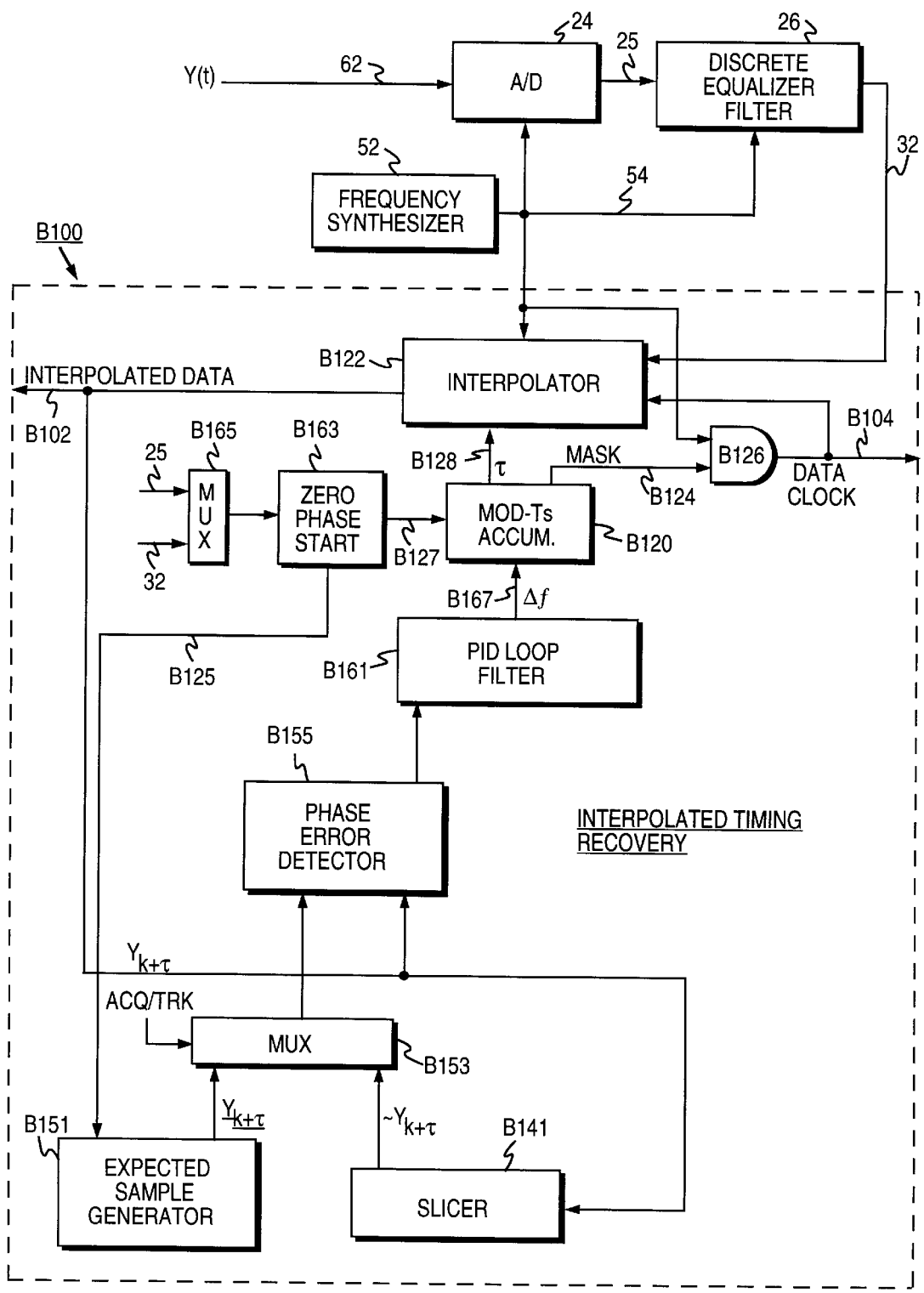
FIG. 4B is a detailed block diagram of the interpolated timing recovery comprising an interpolator responsive to an interpolation interval τ computed as the phase offset between the asynchronous sample values and synchronous sample values.

The interpolated timing recovery B100 of the present invention is shown in FIG. 4B. The VFO B164 in the conventional timing recovery of FIG. 4A is replaced with a modulo-Ts accumulator B120 and an interpolator B122. In addition, an expected sample value generator B151, generates expected samples $Y_{k+\tau}$ used by the phase error detector B155 to compute the phase error during acquisition. A multiplexor B153 selects the estimated sample values ~$Y_{k+\tau}$ from the slicer B141 for use by the phase error detector B155 during tracking. The data clock B104 is generated at the output of an AND gate B126 in response to the sampling clock 54 and a mask signal B124 from the modulo-Ts accumulator B120 as discussed in further detail below. The phase error detector B155 and the slicer B141 process interpolated sample values B102 at the output of the interpolator B122 rather than the channel sample values 32 at the output of the discrete equalizer filter 26 as in FIG. 4A. A PID loop filter B161 controls the closed loop frequency response, similar to the loop filter B160 of FIG. 4A, and generates a frequency offset signal B167. The frequency offset is accumulated by the modulo-Ts accumulator B120 to generate an interpolation interval τ B128 for use by the interpolator B122 in computing the interpolated sample values B102.

In the interpolated timing recovery of the present invention, locking a VFO to a reference frequency before acquiring the preamble is no longer necessary; multiplexing 60 the write clock 54 into the analog receive filter 20 (as in FIG. 1) is not necessary. Further, the sampling device 24 and the discrete equalizer filter 26, together with their associated delays, have been removed from the timing recovery loop; it is not necessary to multiplex B159 around the equalizer filter 26 between acquisition and tracking (as in FIG. 4A). However, it is still necessary to acquire a preamble 68 before tracking the user data 72. To this end, a zero phase restart (ZPR) B163 minimizes the initial phase error between the interpolated sample values and the baud rate at the beginning of acquisition similar to the ZPR B162 of FIG. 4A. However, rather than suspend operation of a sampling VFO B164, the ZPR B163 for interpolated timing recovery computes an initial phase error τ from the A/D 24 sample values 25 or the equalized sample values 32 (as selected through multiplexer B165) and loads this initial phase error into the modulo-Ts accumulator B120 over line B127. The ZPR B163 also generates a control signal B125 for initializing the starting state of the expected sample generator B151 as described below.

The interpolator B122, as described in detail below, comprises a time varying FIR filter responsive to the interpolation interval τ B128 for computing the interpolated sample values. For more details concerning the PID loop filter B161, phase error detector B155, expected sample generator B151, and slicer B141, refer to U.S. patent application Ser. No. 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control" and Ser. No. 08/701,572 entitled "Improved Timing Recovery For Synchronous Partial Response Recording." A detailed description of the modulo-Ts accumulator B120, data clock B104, and interpolator B122 is provided in the following discussion.

Interpolator

Figure 5:
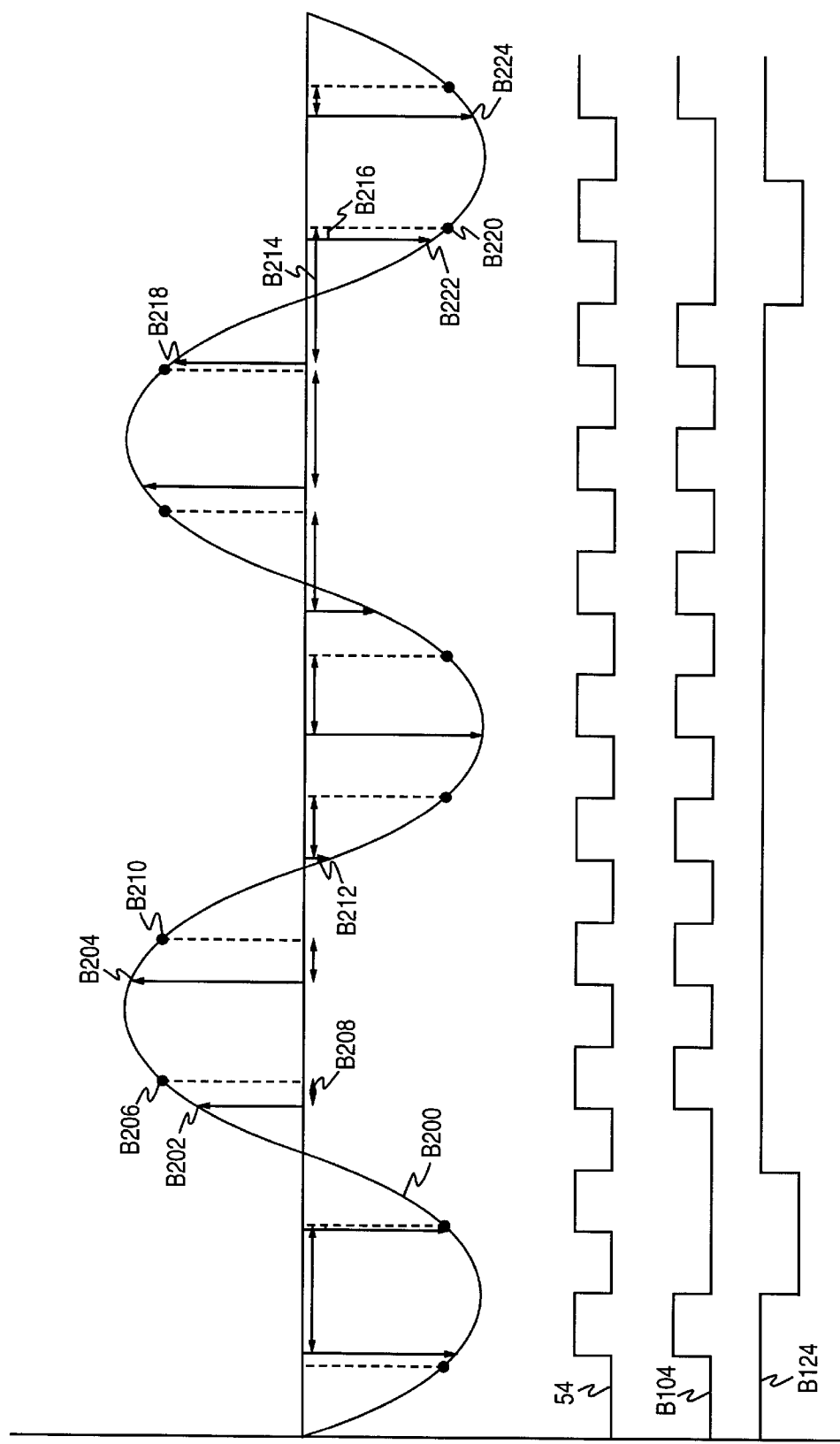
FIG. 5 illustrates the channels samples in relation to the interpolated baud rate samples for the acquisition preamble.

The interpolator B122 of FIG. 4B is understood with reference to FIG. 5 which shows a sampled 2T acquisition preamble signal B200. The target synchronous sample values B102 are shown as black circles and the asynchronous channel sample values 32 as vertical arrows. Beneath the sampled preamble signal is a timing diagram depicting the corresponding timing signals for the sampling clock 54, the data clock B104 and the mask signal B124. As can be seen in FIG. 5, the preamble signal B200 is sampled slightly faster than the baud rate (the rate of the target values).

The function of the interpolator is to estimate the target sample value by interpolating the channel sample values. For illustrative purposes, consider a simple estimation algorithm, linear interpolation:

$$Y(N-1) = x(N-1) + \tau \cdot (x(N) - x(N-1)); \qquad (1)$$

where x(N−1) and x(N) are the channel samples surrounding the target sample; and τ is an interpolation interval proportional to a time 15 difference between the channel sample value x(N−1) and the target sample value. The interpolation interval τ is generated at the output of modulo-Ts accumulator B120 which accumulates the frequency offset signal Δf B167 at the output of the PID loop filter B161:

$$\tau = (\Sigma \Delta f) MOD\ TS \qquad (2)$$

where Ts is the sampling period of the sampling clock 54. Since the sampling clock 54 samples the analog read signal 62 slightly faster than the baud rate, it is necessary to mask the data clock every time the accumulated frequency offset Δf, integer divided by Ts, increments by 1. Operation of the data clock B104 and the mask signal B124 generated by the modulo-Ts accumulator B120 is understood with reference to the timing diagram of FIG. 5.

Assuming the interpolator implements the simple linear equation (1) above, then channel sample values B202 and B204 are used to generate the interpolated sample value corresponding to target sample value B206. The interpolation interval X B208 is generated according to equation (2) above. The next interpolated sample value corresponding to the next target value B210 is computed from channel sample values B204 and B212. This process continues until the interpolation interval τ B214 would be greater than Ts except that it "wraps" around and is actually τ B216 (i.e., the accumulated frequency offset Δf, integer divided by Ts, increments by 1 causing the mask signal B124 to activate). At this point, the data clock B104 is masked by mask signal B124 so that the interpolated sample value corresponding to the target sample value B220 is computed from channel sample values B222 and B224 rather than channel sample values B218 and B222.

The simple linear interpolation of equation (1) will only work if the analog read signal is sampled at a much higher frequency than the baud rate. This is not desirable since operating the channel at higher frequencies increases its complexity and cost. Therefore, in the preferred embodiment the interpolator B122 is implemented as a filter responsive to more than two channel samples to compute the interpolated sample value.

The ideal discrete time phase interpolation filter has a flat magnitude response and a constant group delay of $\tau$:

$$C_\tau(e^{j\omega}) = e^{j\omega\tau} \tag{3}$$

which has an ideal impulse response:

$$\sin c \ (\pi \cdot (n - \tau/T_S)). \tag{4}$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega}) - C_\tau(e^{j\omega})X(e^{j\omega}) \tag{5}$$

where $\overline{C}_\tau(e^{j\omega})$ is the spectrum of the actual interpolation filter, and $x(e^{j\omega})$ is the spectrum of the input signal. From equation (5), the mean squared error is represented by:

$$E_\tau^2 = \frac{1}{2\pi} \int_{-\pi}^{\pi} |\overline{C}_\tau(e^{j\omega}) - e^{j\omega\tau}|^2 |X(e^{j\omega})|^2 d\omega \tag{6}$$

where $X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is bandlimited to some predetermined constant $0 \leq \omega \leq \alpha\pi$ where $0 < \alpha < 1$; that is:

$$|X(e^{j\omega})| = 0,$$

for $$|\omega| \geq \alpha\pi.$$

Then equation (6) can be expressed as:

$$E_{\tau,\alpha}^2 = \frac{1}{2\pi} \int_{-\alpha\pi}^{\alpha\pi} |\overline{C}_\tau(e^{j\omega}) - e^{j\omega\tau}|^2 |X(e^{j\omega})|^2 d\omega. \tag{7}$$

The solution to the minimization problem of equation (7) involves expressing the actual interpolation filter in terms of its coefficients and then solving for the coefficients that minimize the error in a classical mean-square sense.

The actual interpolation filter can be expressed as the FIR polynomial:

$$\overline{C}_\tau(e^{j\omega}) = \sum_{n=-R}^{n=R-1} C_\tau(n) e^{-j\omega n} \tag{8}$$

where 2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi} \int_{-\alpha\pi}^{\alpha\pi} |\sum_{n=-R}^{n=R-1} C_\tau(n) e^{-j\omega n} - e^{j\omega\tau}|^2 |X(e^{j\omega})|^2 d\omega. \tag{9}$$

The next step is to take the derivatives of equation (9) with respect to the coefficients $C_\tau(n)$ and set them to zero:

$$\frac{\partial E_{\tau,\alpha}^2}{\partial c_\tau(n_o)} = 0 \text{ for } n_o = -R, \ldots, 0, 1, \ldots, R-1. \tag{10}$$

After careful manipulation, equation (10) leads to:

$$\int_{-\alpha\pi}^{\alpha\pi} \left[ \left( \sum_{n=-R}^{n=R-1} C_\tau(n) \cos(\omega(n_o - n)) \right) - \cos(\omega(n_o + \tau)) \right] |X(e^{j\omega})|^2 d\omega = 0 \tag{11}$$

$$\text{for } n_o = -R, \ldots, 0, 1, \ldots, R-1.$$

Defining $\phi(r)$ as:

$$\phi(r) = \int_{-\alpha\pi}^{\alpha\pi} |X(e^{j\omega})|^2 \cos(\omega r) d\omega \tag{12}$$

and substituting equation (12) into equation (11) gives:

$$\sum_{n=-R}^{N=R-1} C_\tau(n) \phi(n - n_o) = \phi(n_o + \tau) \tag{13}$$

$$\text{for } n_o = -R, \ldots, 0, 1, \ldots, R-1.$$

Equation (13) defines a set of 2R linear equations in terms of the coefficients $C_\tau(n)$. Equation (13) can be expressed more compactly in matrix form:

$$\Phi_T C_\tau = \Phi_\tau$$

where $C_\tau$ is a column vector of the form:

$$C_\tau = [c_\tau(-R), \ldots, c_\tau(0), \ldots, c_\tau(R-1)]^t$$

$\Phi_T$ is a Toeplitz matrix of the form:

$$\Phi_T = \begin{bmatrix} \phi(0) & \phi(1) & \ldots & \phi(2R-1) \\ \phi(1) & \phi(0) & & \\ \cdot & & & \cdot \\ \cdot & & & \cdot \\ \phi(2R-1) & & \ldots & \phi(0) \end{bmatrix}$$

and $\Phi_\tau$ is a column vector of the form:

$$\Phi_\tau = [\phi(-R+\tau), \ldots, \phi(\tau), \phi(1+\tau), \ldots, \phi(R-1+\tau)]^t. \tag{14}$$

The solution to equation (14) is:

$$C_\tau = \Phi_T^{-1} \Phi_\tau \tag{15}$$

where $\Phi_T^{-1}$ is an inverse matrix that can be solved using well known methods.

Table B2 shows example coefficients $c_\tau(n)$ calculated from equation (15) with 2R=6, $\alpha$=0.8 and $X(e^{j\omega})$=PR4:

TABLE B2

| τ · 32/Ts | C(-2) | C(-1) | C(0) | C(1) | C(2) | C(3) |
|---|---|---|---|---|---|---|
| 0 | 0.0000 | -0.0000 | 1.0000 | 0.0000 | -0.0000 | 0.0000 |
| 1 | 0.0090 | -0.0231 | 0.9965 | 0.0337 | -0.0120 | 0.0068 |
| 2 | 0.0176 | -0.0445 | 0.9901 | 0.0690 | -0.0241 | 0.0135 |
| 3 | 0.0258 | -0.0641 | 0.9808 | 0.1058 | -0.0364 | 0.0202 |
| 4 | 0.0335 | -0.0819 | 0.9686 | 0.1438 | -0.0487 | 0.0268 |
| 5 | 0.0407 | -0.0979 | 0.9536 | 0.1829 | -0.0608 | 0.0331 |
| 6 | 0.0473 | -0.1120 | 0.9359 | 0.2230 | -0.0728 | 0.0393 |
| 7 | 0.0533 | -0.1243 | 0.9155 | 0.2638 | -0.0844 | 0.0451 |
| 8 | 0.0587 | -0.1348 | 0.8926 | 0.3052 | -0.0957 | 0.0506 |
| 9 | 0.0634 | -0.1434 | 0.8674 | 0.3471 | -0.1063 | 0.0556 |
| 10 | 0.0674 | -0.1503 | 0.8398 | 0.3891 | -0.1164 | 0.0603 |
| 11 | 0.0707 | -0.1555 | 0.8101 | 0.4311 | -0.1257 | 0.0644 |
| 12 | 0.0732 | -0.1589 | 0.7784 | 0.4730 | -0.1341 | 0.0680 |
| 13 | 0.0751 | -0.1608 | 0.7448 | 0.5145 | -0.1415 | 0.0710 |
| 14 | 0.0761 | -0.1611 | 0.7096 | 0.5554 | -0.1480 | 0.0734 |
| 15 | 0.0765 | -0.1598 | 0.6728 | 0.5956 | -0.1532 | 0.0751 |
| 16 | 0.0761 | -0.1572 | 0.6348 | 0.6348 | -0.1572 | 0.0761 |
| 17 | 0.0751 | -0.1532 | 0.5956 | 0.6728 | -0.1598 | 0.0765 |
| 18 | 0.0734 | -0.1480 | 0.5554 | 0.7096 | -0.1611 | 0.0761 |
| 19 | 0.0710 | -0.1415 | 0.5145 | 0.7448 | -0.1608 | 0.0751 |
| 20 | 0.0680 | -0.1341 | 0.4730 | 0.7784 | -0.1589 | 0.0732 |
| 21 | 0.0644 | -0.1257 | 0.4311 | 0.8101 | -0.1555 | 0.0707 |
| 22 | 0.0603 | -0.1164 | 0.3891 | 0.8398 | -0.1503 | 0.0674 |
| 23 | 0.0556 | -0.1063 | 0.3471 | 0.8674 | -0.1434 | 0.0634 |
| 24 | 0.0506 | -0.0957 | 0.3052 | 0.8926 | -0.1348 | 0.0587 |
| 25 | 0.0451 | -0.0844 | 0.2638 | 0.9155 | -0.1243 | 0.0533 |
| 26 | 0.0393 | -0.0728 | 0.2230 | 0.9359 | -0.1120 | 0.0473 |
| 27 | a.0331 | -0.0608 | 0.1829 | 0.9536 | -0.0979 | 0.0407 |
| 28 | 0.0268 | -0.0487 | 0.1438 | 0.9686 | -0.0819 | 0.0335 |
| 29 | 0.0202 | -0.0364 | 0.1058 | 0.9808 | -0.0641 | 0.0258 |
| 30 | 0.0135 | -0.0241 | 0.0690 | 0.9901 | -0.0445 | 0.0176 |
| 31 | 0.0068 | -0.0120 | 0.0337 | 0.9965 | -0.0231 | 0.0090 |

Figure 6:
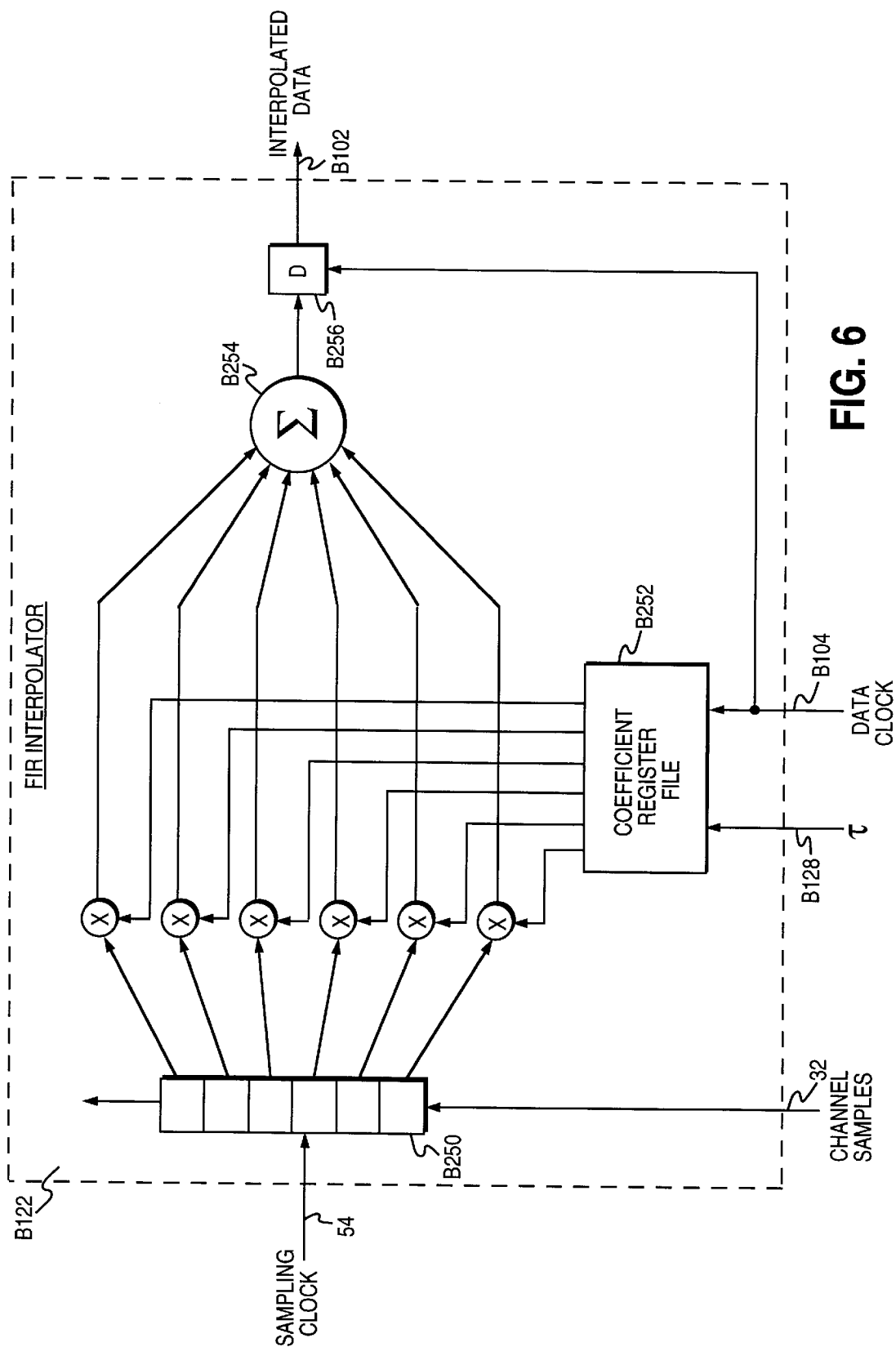
FIG. 6 shows an FIR filter implementation for the timing recovery interpolator.

FIG. 6 shows an implementation of a six tap FIR filter which operates according to the coefficients shown in Table B2. A shift register B250 receives the channel samples 32 at the sampling clock rate 54. The filter coefficients $C_\tau(n)$ are stored in a coefficient register file B252 and applied to corresponding multipliers according to the current value of τ B128. The coefficients are multiplied by the channel samples 32 stored in the shift register B250. The resulting products are summed B254 and the sum stored in a delay register B256. The coefficient register file B252 and the delay register B256 are clocked by the data clock B104 to implement the masking function described above.

In an alternative embodiment not shown, a plurality of static FIR filters, having coefficients that correspond to the different values of τ, filter the sample values in the shift register B250. Each filter outputs an interpolation value, and the current value of the interpolation interval τ B128 selects the output of the corresponding filter as the output B102 of the interpolator B122. Since the coefficients of one filter are not constantly updated as in FIG. 6, this multiple filter embodiment increases the speed of the interpolator B122 and the overall throughput of the read channel.

Rather than store all of the coefficients of the interpolation filters in memory, an alternative implementation is to compute the filter coefficients $C_\tau(n)$ in real time as a function of τ. For example, the filter coefficients $C_\tau(n)$ can be computed in real time according to a predetermined polynomial in τ (see, for example, U.S. Pat. No. 4,866,647 issued to Farrow entitled, "A Continuously Variable Digital Delay Circuit," the disclosure of which is hereby incorporated by reference).

The preferred embodiment, however, for computing the filter coefficients in real time is to use a reduced rank matrix. Consider that the bank of filter coefficients stored in the coefficient register file B252 of FIG. 6 can be represented as an M×N matrix $A_{M \times N}$, where N is the depth of the interpolation filter (i.e., the number of coefficients $C_\tau(n)$ in the impulse response computed according to equation (15)) and M is the number of interpolation intervals (i.e., the number of τ intervals). Rather than store the entire $A_{M \times N}$ matrix in memory, it is possible to store a reduced rank matrix generated in using factorization and singular value decomposition (SVD) of the $A_{M \times N}$ matrix.

Consider that the $A_{M \times N}$ matrix can be factored into an $F_{M \times N}$ and $G_{N \times N}$ matrix, $$A_{M \times N} = F_{M \times N} \cdot G_{N \times N}.$$

Then a reduced rank approximation of the $A_{M \times N}$ matrix can be formed by reducing the size of the $F_{M \times N}$ and $G_{N \times N}$ matrices by replacing N with L where L<N and, preferably, L<<N. Stated differently, find the $F_{M \times L}$ and $G_{L \times N}$ matrices whose product best approximates the $A_{M \times N}$ matrix, $$A_{M \times N} \approx F_{M \times L} \cdot G_{L \times N}.$$

Figure 7:
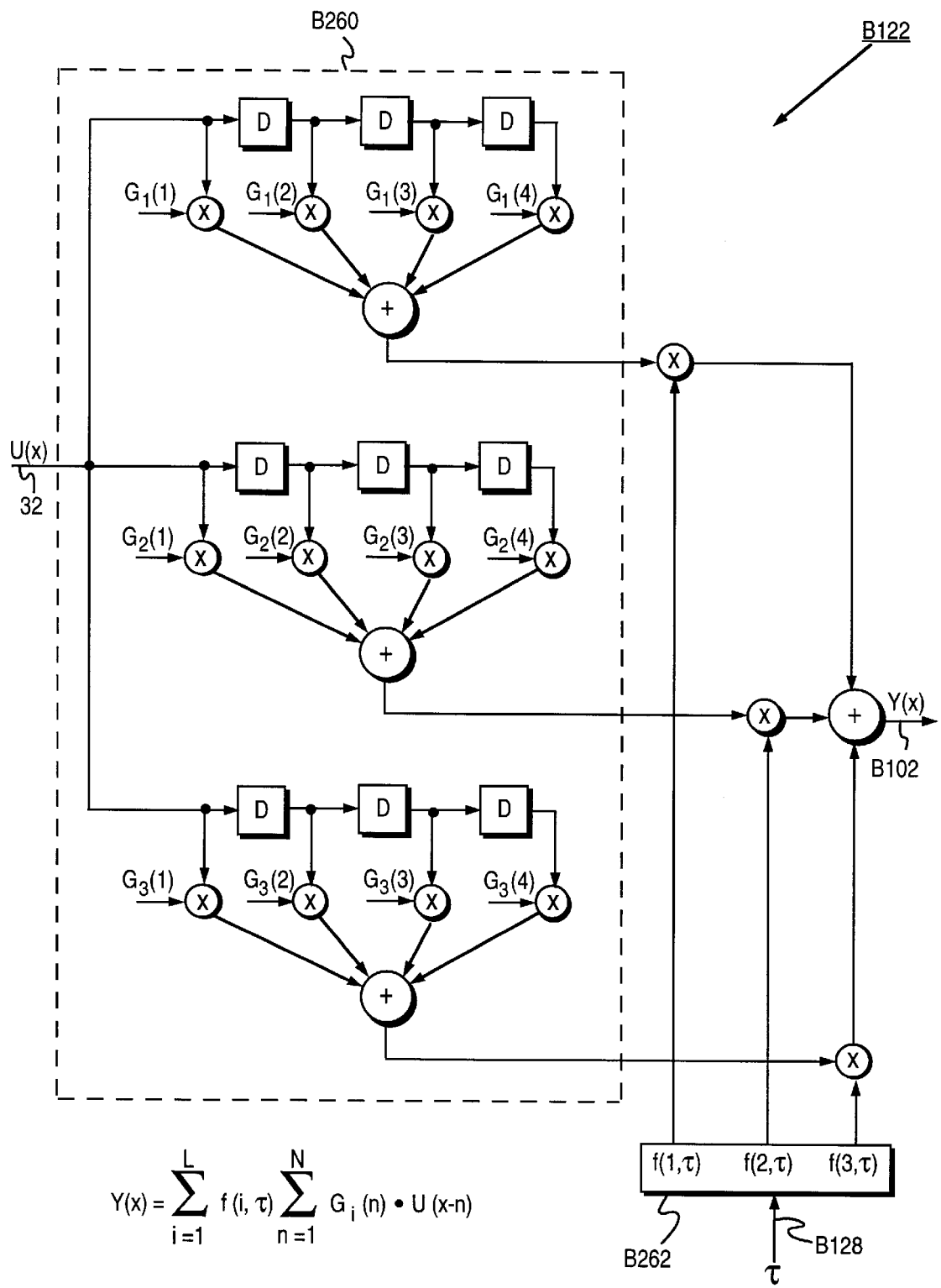
FIG. 7 depicts an alternative embodiment for the timing recovery interpolator.

The convolution process of the interpolation filter can then be carried out, as shown in FIG. 7, by implementing the $G_{L \times N}$ matrix as a bank of FIR filters B260 connected to receive the channel sample values 32, and the $F_{M \times L}$ matrix implemented as a lookup table B262 indexed by τ B128 (as will become more apparent in the following discussion). Those skilled in the art will recognize that, in an alternative embodiment, the $A_{M \times N}$ matrix can be factored into more than two matrices (i.e., A ≈FGH . . . ).

The preferred method for finding the $F_{M \times L}$ and $G_{L \times N}$ matrices is to minimize the following sum of squared errors:

$$\sum_{j=1}^{M} \sum_{n=1}^{N} (A_{jn} - (F_{M \times L} \cdot G_{L \times N})_{jn})^2 \quad (16)$$

The solution to equation (16) can be derived through a singular value decomposition of the $A_{M \times N}$ matrix, comprising the steps of:

1. performing an SVD on the $A_{M \times N}$ matrix which gives the following unique factorization (assuming M≧N):

$$A_{M \times N} = U_{M \times N} \cdot D_{N \times N} \cdot V_{N \times N}$$

where:

$U_{M \times N}$ is a M×N unitary matrix;

$D_{N \times N}$ is a N×N diagonal matrix $\{\sigma_1, \sigma_2, \ldots, \sigma_N\}$ where $\sigma_i$ are the singular values of $A_{M \times N}$, and $\sigma_1 \geq \sigma_2 \ldots \geq \sigma_N \geq 0$; and $V_{N \times N}$ is a N×N unitary matrix;

2. selecting a predetermined L number of the largest singular values σ to generate a reduced size diagonal matrix $D_{L \times L}$:

$$D_{L \times L} = Diag\{\sigma_1, \sigma_2, \ldots, \sigma_L\} = \begin{bmatrix} \sigma_1 & 0 & \ldots & 0 \\ 0 & \sigma_2 & 0 & \ldots & . \\ . & & & & 0 \\ . & & & & \\ 0 & \ldots & 0 & \sigma_L \end{bmatrix}$$

3. extracting the first L columns from the $U_{M \times N}$ matrix to form a reduced $U_{M \times L}$ matrix:

$$U_{M \times L} = \begin{bmatrix} U_{1,1} & \ldots & U_{1,L} & \ldots & U_{1,N} \\ \cdot & \ldots & \ldots & \ldots & \cdot \\ \cdot & & & & \cdot \\ \cdot & \ldots & \ldots & \ldots & \cdot \\ U_{M,1} & \ldots & U_{M,L} & \ldots & U_{M,N} \end{bmatrix}$$

4. extracting the first L rows from the $V_{N \times N}$ matrix to form a reduced $V_{L \times N}$ matrix:

$$V_{L \times N} = \begin{bmatrix} V_{1,1} & \ldots & V_{1,N} \\ \cdot & \ldots & \cdot \\ V_{L,1} & \ldots & V_{L,N} \\ \cdot & \ldots & \cdot \\ V_{N,1} & \ldots & V_{N,N} \end{bmatrix}$$

5. defining the $F_{M \times L}$ and $G_{L \times N}$ matrices such that:

$$F_{M \times L} \cdot G_{L \times N} = U_{M \times L} \cdot D_{L \times L} \cdot V_{L \times N} \approx A_{M \times N}$$

(for example, let $F_{M \times L} = U_{M \times L} \cdot D_{L \times L}$ and $G_{L \times N} = V_{L \times N}$).

In the above cost reduced polynomial and reduced rank matrix embodiments, the interpolation filter coefficients $C_\tau(n)$ are computed in real time as a function of $\tau$; that is, the filter's impulse response $h(n)$ is approximated according to:

$$h(n, \tau) = c_\tau(n) = \sum_{i=1}^{L} G_i(n) \cdot f(i, \tau) \quad (17)$$

where $f(i,\tau)$ is a predetermined function in $\tau$ (e.g., polynomial in $\tau$, or $\tau$ indexes the above $F_{M \times L}$ matrix); L is a degree which determines the accuracy of the approximation (e.g., the order of the polynomial, or the column size of the above $F_{M \times L}$ matrix); and $G_i(n)$ is a predetermined matrix (e.g., the coefficients of the polynomial, or the above $G_{L \times N}$ matrix). As L increases, the approximated filter coefficients $C_\tau(n)$ of equation (17) tend toward the ideal coefficients derived from equation (15). It follows from equation (17) that the output of the interpolation filter Y(x) can be represented as:

$$Y(x) = \sum_{n=1}^{N} U(x-n) \sum_{i=1}^{L} G_i(n) \cdot f(i, \tau) \quad (18)$$

where U(x) are the channel sample values 32 and N is the number of interpolation filter coefficients $C_\tau(n)$.

Referring again to FIG. 6, the coefficient register file B252 can compute the interpolation filter coefficients $C_\tau(n)$ according to equation (17) and then convolve the coefficients $c_\tau(n)$ with the channel samples U(x) 32 to generate the interpolated sample values B102 synchronized to the baud rate. However, a more efficient implementation of the interpolation filter can be achieved by rearranging equation (18):

$$Y(x) = \sum_{i=1}^{L} f(i, \tau) \sum_{n=1}^{N} G_i(n) \cdot U(x - n) \quad (19)$$

FIG. 7 shows the preferred embodiment of the interpolation filter according to equation (19). In the polynomial embodiment, the function of $\tau$ is a polynomial in $\tau$, and the matrix $G_i(n)$ are the coefficients of the polynomial. And in the reduced rank matrix embodiment, the function of $\tau$ is to index the above $F_{M \times L}$ matrix B262, and the second summation in equation (19), $$\sum_{n=1}^{N} G_i(n) \cdot U(x - n)$$

is implemented as a bank of FIR filters B260 as shown in FIG. 7. Again, in equation (19) L is the depth of the approximation function $f(i,\tau)$ (e.g., the order of the polynomial, or the column size of the above $F_{M \times L}$ matrix) and N is the depth of the interpolation filter's impulse response (i.e., the number of coefficients in the impulse response). It has been determined that N=8 and L=3 provides the best performance/cost balance; however, these values may increase as IC technology progresses and the cost per gate decreases.

ITR Zero Phase Restart

Figure 8A:
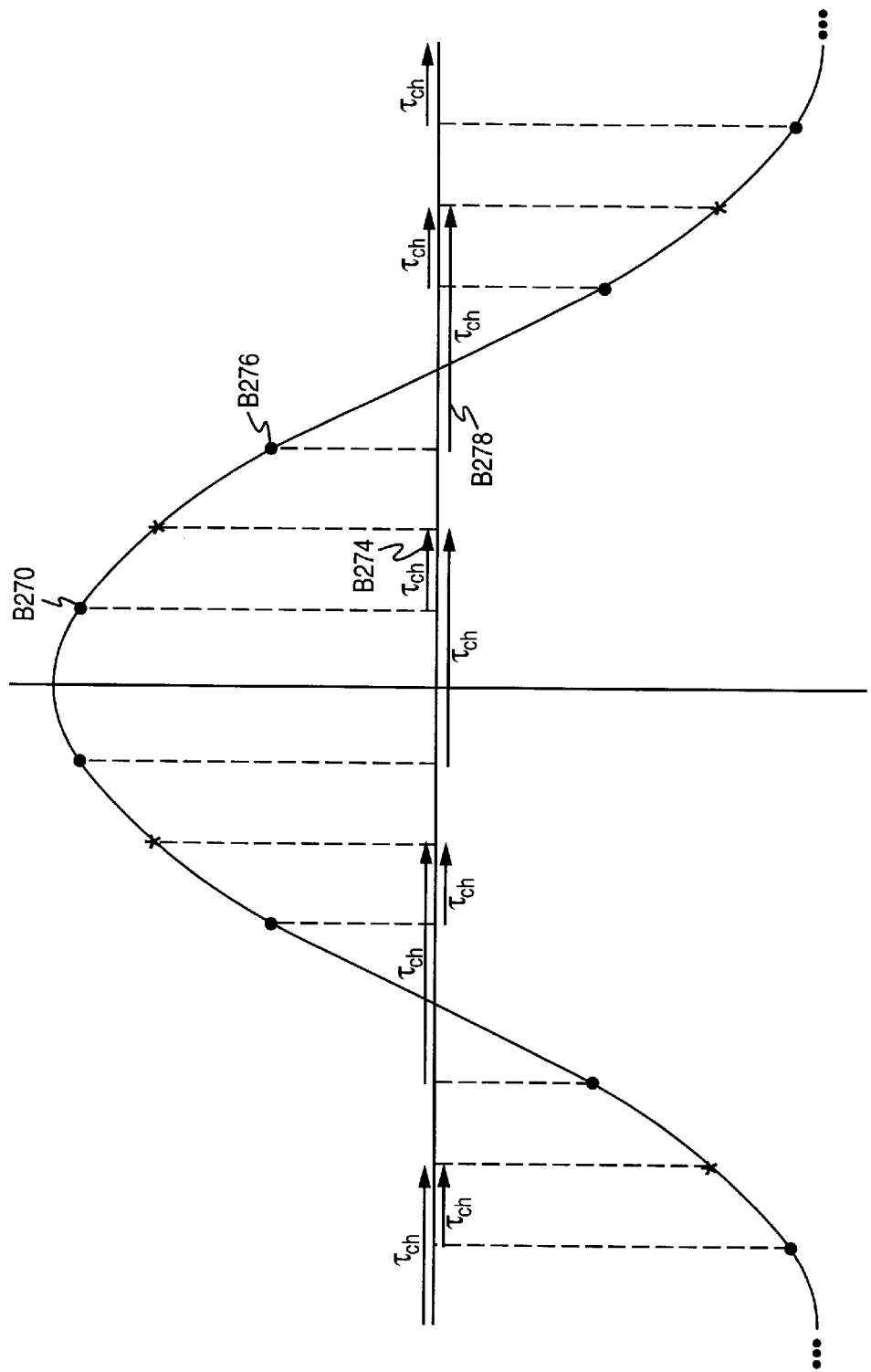
FIG. 8A shows a 2T acquisition preamble relative to various initial sampling phases.
Figure 8B:
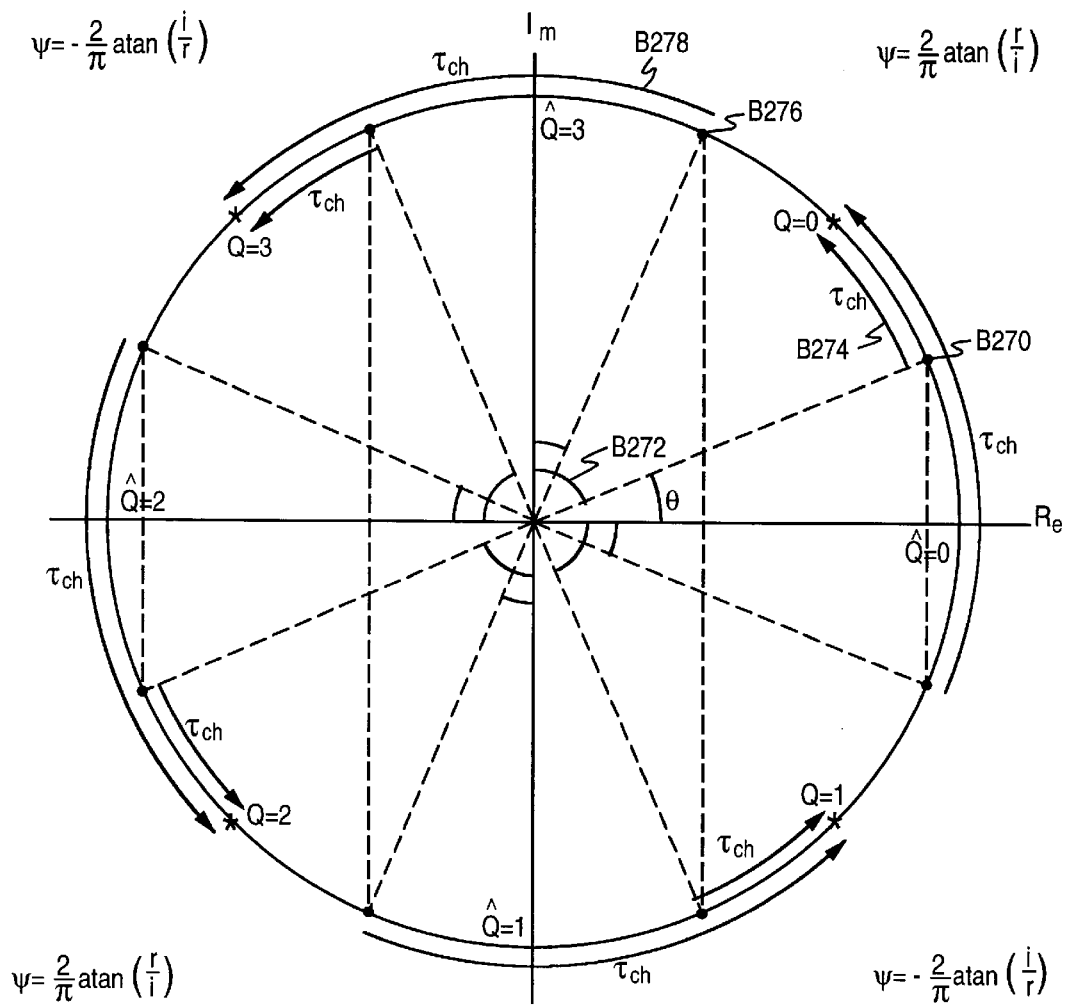
FIG. 8B shows the arctangent quadrant for the phase of the sampled read signal relative to a predetermined reference sample.

Operation of the interpolated timing recovery zero phase restart (ZPR) circuit B163 of FIG. 4B is understood with reference to FIG. 8A and 8B which show various initial sampling phases of the 2T acquisition preamble. The objective is to compute the initial interpolation interval $\tau$ (see FIG. 5) with respect to a predetermined reference sample, and to load the initial $\tau$ into the modulo-Ts accumulator B120 of FIG. 4B. FIG. 8A shows the desired interpolation interval $\tau_{ch}$ (with reference to the channel or baud rate) for various phase offsets of the reference sample. The phase offset of the reference sample (designated by "·") relative to the desired interpolated sample (designated by "★") is a function of the phase of the sampling clock 54 with respect to the read signal 62.

Consider that the continuous time preamble signal can be modeled in discrete time as a cosine signal cos(ωt) sampled at the channel rate (baud rate) with frequency and phase offsets of zero (i.e., y(k)=cos (kπ/2)=+1, 0, −1, 0, +1 . . . ). Then the sampling clock 54 and the sampling device 24 can be modeled as a phase shift θ; that is, the output of the sampling device 24 is y(k)=cos (kπ/2+θ) assuming that the sampling frequency is equal to the baud rate. The objective of zero phase restart, then, is to compute the phase shift θ of the sampling clock 54 with respect to the read signal 62 in order to compute the initial interpolation interval $\tau$.

One method for estimating the phase shift θ is to compute the discrete fourier transform (DFT) of the sampled output sequence y(k)=cos (kπ/2+θ) at the preamble frequency (i.e., $Y(e^{j\pi/2})$) where y(0) is a predetermined reference sample and the phase shift θ is determined from the phase of $Y(e^{j\pi/2})$, $$Y\left(e^{j\frac{\pi}{2}}\right) = \sum_k y_k e^{-jk\frac{\pi}{2}} \quad (20)$$

From equation (20), the DFT of the output sequence can be represented as $Y(e^{j\pi/2})$=+y(0)−jy(1)−y(2)+jy(3)+y(4)−jy(5) . . . or $$Y\left(e^{j\frac{\pi}{2}}\right) = \left(\sum_k y(4k) - \sum_k y(4k+2)\right) + j\left(\sum_k y(4k+3) - \sum_k y(4k+1)\right) \quad (21)$$

From equation (21), notice that $Y(e^{j\pi/2})$ comprises an imaginary and real component, and the phase of $Y(e^{j\pi/2})$ is, $$\angle Y\left(e^{j\frac{\pi}{2}}\right) = \frac{2}{\pi} \arctan\left(\frac{imag}{real}\right) = \frac{2}{\pi}\arctan\left(\frac{\sum_k y(4k+3) - \sum_k y(4k+1)}{\sum_k y(4k) - \sum_k y(4k+2)}\right) \quad (22)$$

In equation (22), the arc tan is multiplied by $2/\pi$ to convert the angle from a radian measurement to a fraction of the baud period (where the baud period is normalized to 1).

Referring again to FIG. 8A and FIG. 8B, FIG. 8B shows the arc tangent quadrant for each of the reference samples of FIG. 8A. For the quadrant designated $\hat{Q}=3$ (i.e., $\theta=0 \to 1$) the initial interpolation interval $\tau_{ch}$ is computed as, $$\tau_{ch} = \text{frac}(\psi + \beta) \quad (23)$$

where frac(x) returns the factional part of the argument x, $\psi = 1-\theta$, and $\beta$ is the phase of the desired interpolated samples "★" (i.e., $\beta = \frac{1}{2}$ if the sampling frequency equals the baud rate). Consider, for example, the reference sample value B270 in FIG. 8A and 8B; the angle $\psi$ B272 of equation (23) is computed as, $$\psi = 1 - \theta = 2/\pi \cdot \arctan\,(\text{real/imag})$$

and the initial interpolation interval $\tau_{ch}$ B274 is computed as, $$\tau_{ch} = \text{frac}(\psi + \beta) = \text{frac}(2/\pi \cdot \arctan\,(r/i) + \frac{1}{2}) = \frac{1}{4}.$$

Similarly, if the reference sample is B276, then the initial interpolation interval $\tau_{ch}$ B278 is computed as, $$\tau_{ch} = \text{frac}(\psi + \beta) = \text{frac}(2/\pi \cdot \arctan\,(r/i) + \frac{1}{2}) = \frac{3}{4}.$$

For the quadrant designated as $\hat{Q}_0$ (i.e., $\theta = 0 \to -1$), the initial interpolation interval $\tau_{ch}$ is computed as, $$\tau_{ch} = \text{frac}(\psi + \beta)$$

where $\psi = -\theta = -2/\pi \cdot \arctan\,(\text{imag/real})$. Similarly, for the quadrant $\hat{Q}_1$, $$\psi = 2/\pi \cdot \arctan\,(\text{real/imag})$$

and for the quadrant $\hat{Q}_2$, $$\psi = -2/\pi \cdot \arctan\,(\text{imag/real}).$$

In the above discussion, the initial interpolation interval $\tau_{ch}$ was derived with the sampling frequency equal to the channel rate (baud rate). However, as described above with reference to FIG. 5, the actual sampling frequency for interpolated timing recovery is selected to be slightly higher than the baud rate (e.g., $\Delta f = 0.05$ and $f_s = 1.05 \cdot f_{ch}$). To account for this oversampling by $\Delta f$, the interpolation interval at the channel rate $\tau_{ch}$ is converted into an interpolation interval at the sampling rate $\tau_S$ according to, $$\tau_s = \text{frac}((1+\Delta f)\tau_{ch}). \quad (24)$$

If $(1+\Delta f) \cdot \tau_{ch} > 1$, it means that $\tau_S$ has "wrapped" as described above with reference to FIG. 5 and the mask signal B124 of FIG. 4B is asserted to mask the data clock B104 during the next sampling interval. Thus, a "wrap" indicator $w_O$ is also generated by the ZPR circuit B163 of FIG. 4B according to, $$w_O = \text{int}((1+\Delta f)\tau_{ch}) \quad (25)$$

where int(x) returns the integer part of the argument x.

Another consideration in computing the initial interpolation interval is the bias of the DFT phase estimate. In the preferred embodiment described below, 16 sample values are used to compute an approximated or "windowed" DFT phase estimate with the reference sample selected as the 10th sample (i.e., $k_{ref}=9$). Thus, the bias of the DFT is proportional to the difference between the middle of the DFT window and the position of the reference sample (i.e., $k_{ref} - (15/7) = 9 - 7.5 = 1.5$), and this bias is a function of the oversampling percentage $\Delta f$. Thus, the DFT bias is computed as, $$\text{DFT bias} = ((k_{ref} - 7.5) \cdot \Delta f)/(1+\Delta f).$$

The DFT bias is incorporated into equation (23) by adding it to $\beta$, $$\beta = \frac{1}{2} + ((k_{ref} - 7.5) \cdot \Delta f)/(1+\Delta f).$$

Referring back to FIG. 4B, the expected sample value generator B151 generates the expected (or interpolated) samples of the preamble during acquisition for use in computing the phase error B155. As indicated in FIG. 8A and 8B, the expected sample $Y_{(k)}$ (designated by "★") can occur in one of four quadrants Q reflected in Table B3:

TABLE B3

| $Y_{(k-1)}$ | $Y_{(k)}$ | Q |
|---|---|---|
| + | − | 3 |
| − | − | 2 |
| − | + | 1 |
| + | + | 0 |

The ZPR circuit B163 of FIG. 4B generates a signal over line B125 to initialize the starting state of the expected sample generator B151 corresponding to the quadrant of the reference sample. After being initialized, the expected sample generator B151 generates the expected sample values $Y_{(k-1)}$ and $Y_{(k)}$ by cycling through the preamble quadrants (e.g., +−, −−, −+, ++, +−, −−, . . . ).

The quadrant $\hat{Q}$ of the reference sample can be determined by evaluating the sign of the real and imaginary component of $Y(e^{j\pi/2})$ in equation (21) with reference to Table B4:

TABLE B4

| real | imag | $\hat{Q}$ |
|---|---|---|
| + | + | 3 |
| + | − | 2 |
| − | − | 1 |
| − | + | 0 |

Note that in FIG. 8B the quadrants Q corresponding to the baud rate samples (expected samples) are offset by $\frac{1}{2}$ from the quadrants $\hat{Q}$ corresponding to the reference samples. Thus, the ZPR circuit B163 of FIG. 4B initializes the expected sample value generator B151 to, $$Q = (\hat{Q} + \Delta Q) \bmod 4 \quad (26)$$

where $\Delta Q$ is computed as, $$\Delta Q = \text{int}(\psi+\beta).$$

In other words, $\Delta Q=0$ or $1$, and the expected sample quadrant $Q$ of equation (26) is incremented by 1 when $(\psi+\beta) \geq 1$. The modulo 4 division in equation (26) causes $\hat{Q}=3+1$ to wrap back to $\hat{Q}=0$.

Figure 9:
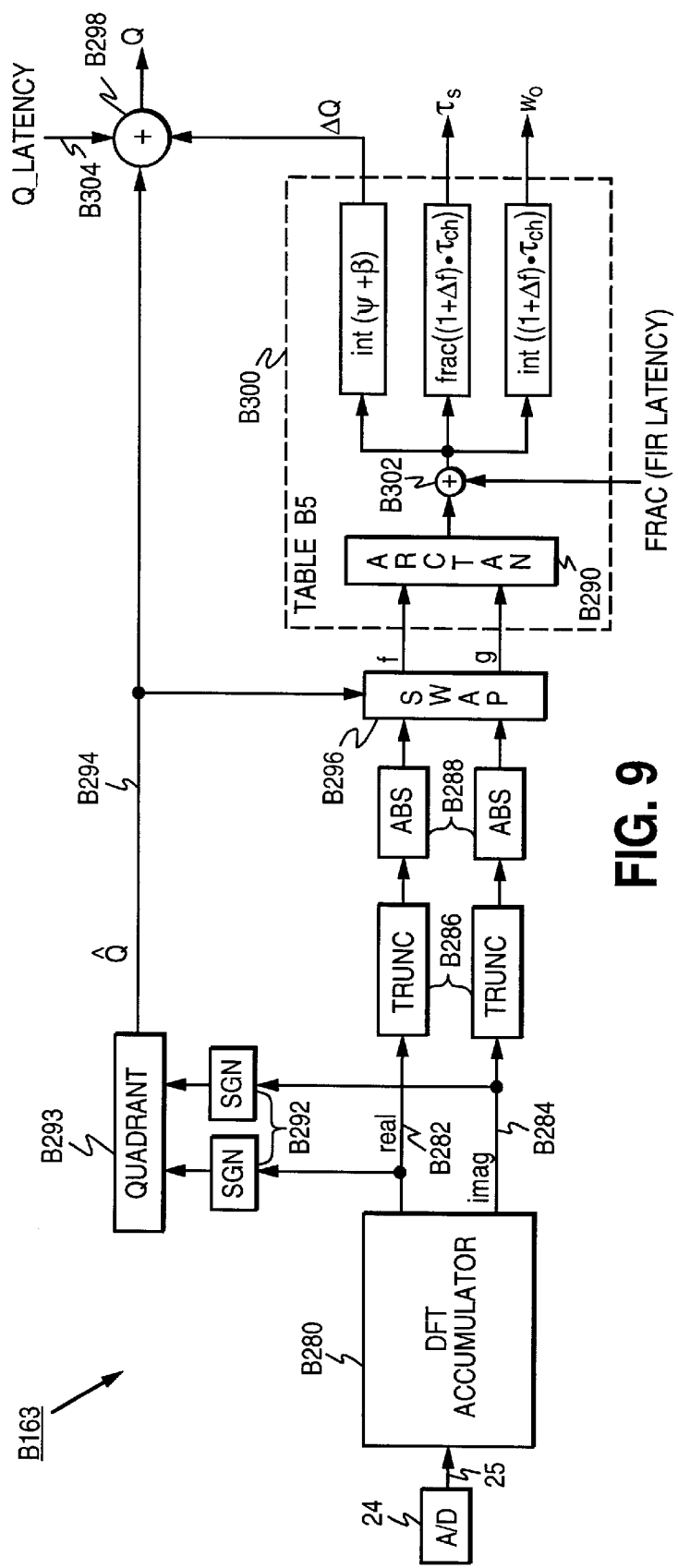
FIG. 9 is a block diagram of the zero phase restart circuit of the present invention for computing the initial sampling phase offset (i.e., initial interpolation interval τ) shown in FIG. 8A and 8B.

FIG. 9 shows a block diagram of the ZPR circuit B163 which generates the above described signals: $\tau_S$ the initial interpolation interval, $w_O$ the wrap signal, and Q the initial quadrant of the expected sample generator B151 of FIG. 4B. In operation, the A/D sample values 25 are input into a DFT accumulator B280 which accumulates a predetermined number of samples to generate the real B282 and imaginary B284 components of equation (21). The number of samples accumulated should be even to reduce the DFT variance, and in the preferred embodiment, 16 samples are accumulated with the reference sample selected as the 10th sample (i.e., $k_{ref}=9$). Thus, the DFT accumulator B280 computes:

$$\text{imag} = +Y_k - Y_{k+2} + Y_{k+4} - Y_{k+6} + Y_{k+8} - Y_{k+10} + Y_{k+12} - Y_{k+14}$$

$$\text{real} = +Y_{k+1} - Y_{k+3} + Y_{k+5} - Y_{k+7} + Y_{k+9} - Y_{k+11} + Y_{k+13} - Y_{k+15}$$

where $Y_k$ is the 1st sample and $Y_{k+15}$ is the 16th sample. The real B282 and imaginary B284 components are truncated B286 and converted to an absolute value B288 in order to simplify the arc tangent computation B290 described above.

Referring back to FIG. 8B, the angle $\psi$ of equation (23) is computed relative to the arc tan(real/imag) or arc tan (imag/real) depending on the quadrant $\hat{Q}$ of the reference sample. To this end, in FIG. 9 the sign B292 of the real B282 and imaginary B284 components are evaluated B293 according to Table B4 to determine the quadrant $\hat{Q}$ B294 of the reference sample, and the real and imaginary components are conditionally swapped B296 before computing an arc tan(f/g) B290. The result of arc tan(f/g) B290 is used to compute the initial interpolation interval $\tau_S$, the wrap signal $w_O$, and the quadrant offset $\Delta Q$ according to the above equations. The quadrant offset $\Delta Q$ is added modulo 4 to the quadrant $\hat{Q}$ of the reference sample at adder B298 to generate the initial quadrant Q for the expected sample value generator B151 of FIG. 4B as described above with reference to equation (26).

The arc tan(f/g) B290 can be implemented as a circuit or a lookup table. In the preferred embodiment, the arc tan(f/g), $\tau_S$, $w_O$, and $\Delta Q$ are generated using a lookup table B300 addressed by f and g. Table B5 shows such a table addressed by f and g, where each entry contains a corresponding value for $\Delta Q$, $w_O$, and $\tau_S \cdot 32$. From the above equations, it should be apparent that the entries of Table B5 vary with the amount of oversampling $\Delta f$ and the position of the reference sample with respect to the middle of the DFT window. The entries of Table B5 were generated with $\Delta f=101/2048$, and with the reference sample selected as the 10th out of 16 samples used to generate the DFT phase estimate.

TABLE B5

| g/f | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1,0 | 1,0 | 1,0 | 1,0 | 1,0 | 1,0 | 1,0 | 1,0 | 1,0 | 1,0 | 1,0 | 1,0 | 1,0 | 1,0 | 1,0 | 1,0 |
|   | 2 | 12 | 14 | 16 | 16 | 17 | 17 | 17 | 17 | 18 | 18 | 18 | 18 | 18 | 18 | 18 |
| 1 | 0,0 | 1,0 | 1,0 | 1,0 | 1,0 | 1,0 | 1,0 | 1,0 | 1,0 | 1,0 | 1,0 | 1,0 | 1,0 | 1,0 | 1,0 | 1,0 |
|   | 26 | 2 | 7 | 10 | 12 | 13 | 14 | 14 | 15 | 15 | 16 | 16 | 16 | 16 | 16 | 17 |
| 2 | 0,0 | 0,0 | 1,0 | 1,0 | 1,0 | 1,0 | 1,0 | 1,0 | 1,0 | 1,0 | 1,0 | 1,0 | 1,0 | 1,0 | 1,0 | 1,0 |
|   | 23 | 30 | 2 | 5 | 8 | 10 | 11 | 12 | 13 | 13 | 14 | 14 | 14 | 15 | 15 | 15 |
| 3 | 0,0 | 0,0 | 0,1 | 1,0 | 1,0 | 1,0 | 1,0 | 1,0 | 1,0 | 1,0 | 1,0 | 1,0 | 1,0 | 1,0 | 1,0 | 1,0 |
|   | 22 | 27 | 0 | 2 | 5 | 7 | 8 | 9 | 10 | 11 | 12 | 12 | 13 | 13 | 14 | 14 |
| 4 | 0,0 | 0,0 | 0,0 | 0,1 | 1,0 | 1,0 | 1,0 | 1,0 | 1,0 | 1,0 | 1,0 | 1,0 | 1,0 | 1,0 | 1,0 | 1,0 |
|   | 21 | 26 | 29 | 1 | 2 | 4 | 6 | 7 | 8 | 9 | 10 | 11 | 11 | 12 | 12 | 13 |
| 5 | 0,0 | 0,0 | 0,0 | 0,0 | 1,0 | 1,0 | 1,0 | 1,0 | 1,0 | 1,0 | 1,0 | 1,0 | 1,0 | 1,0 | 1,0 | 1,0 |
|   | 21 | 24 | 28 | 31 | 0 | 2 | 4 | 5 | 6 | 7 | 8 | 9 | 10 | 10 | 11 | 11 |
| 6 | 0,0 | 0,0 | 0,0 | 0,0 | 0,1 | 1,0 | 1,0 | 1,0 | 1,0 | 1,0 | 1,0 | 1,0 | 1,0 | 1,0 | 1,0 | 1,0 |
|   | 20 | 24 | 27 | 29 | 0 | 0 | 2 | 3 | 5 | 6 | 7 | 8 | 8 | 9 | 10 | 10 |
| 7 | 0,0 | 0,0 | 0,0 | 0,0 | 0,0 | 0,1 | 1,0 | 1,0 | 1,0 | 1,0 | 1,0 | 1,0 | 1,0 | 1,0 | 1,0 | 1,0 |
|   | 20 | 23 | 26 | 28 | 30 | 0 | 0 | 2 | 3 | 4 | 5 | 6 | 7 | 8 | 8 | 9 |
| 8 | 0,0 | 0,0 | 0,0 | 0,0 | 0,0 | 0,0 | 0,1 | 1,0 | 1,0 | 1,0 | 1,0 | 1,0 | 1,0 | 1,0 | 1,0 | 1,0 |
|   | 20 | 22 | 25 | 27 | 29 | 31 | 1 | 1 | 2 | 3 | 4 | 5 | 6 | 7 | 7 | 8 |
| 9 | 0,0 | 0,0 | 0,0 | 0,0 | 0,0 | 0,0 | 0,0 | 0,1 | 1,0 | 1,0 | 1,0 | 1,0 | 1,0 | 1,0 | 1,0 | 1,0 |
|   | 20 | 22 | 24 | 26 | 28 | 30 | 31 | 1 | 1 | 2 | 3 | 4 | 5 | 6 | 6 | 7 |
| 10 | 0,0 | 0,0 | 0,0 | 0,0 | 0,0 | 0,0 | 0,0 | 0,1 | 1,0 | 1,0 | 1,0 | 1,0 | 1,0 | 1,0 | 1,0 | 1,0 |
|   | 20 | 22 | 24 | 26 | 27 | 29 | 31 | 0 | 0 | 1 | 2 | 3 | 4 | 5 | 5 | 6 |
| 11 | 0,0 | 0,0 | 0,0 | 0,0 | 0,0 | 0,0 | 0,0 | 0,0 | 0,1 | 1,0 | 1,0 | 1,0 | 1,0 | 1,0 | 1,0 | 1,0 |
|   | 20 | 21 | 23 | 25 | 27 | 28 | 30 | 31 | 0 | 0 | 1 | 2 | 3 | 4 | 4 | 5 |
| 12 | 0,0 | 0,0 | 0,0 | 0,0 | 0,0 | 0,0 | 0,0 | 0,0 | 0,1 | 1,0 | 1,0 | 1,0 | 1,0 | 1,0 | 1,0 | 1,0 |
|   | 20 | 21 | 23 | 24 | 26 | 28 | 29 | 30 | 31 | 1 | 0 | 1 | 2 | 3 | 3 | 4 |
| 13 | 0,0 | 0,0 | 0,0 | 0,0 | 0,0 | 0,0 | 0,0 | 0,0 | 0,0 | 0,1 | 0,1 | 1,0 | 1,0 | 1,0 | 1,0 | 1,0 |
|   | 19 | 21 | 23 | 24 | 26 | 27 | 28 | 29 | 31 | 0 | 1 | 0 | 1 | 2 | 3 | 3 |
| 14 | 0,0 | 0,0 | 0,0 | 0,0 | 0,0 | 0,0 | 0,0 | 0,0 | 0,0 | 0,0 | 0,1 | 0,1 | 1,0 | 1,0 | 1,0 | 1,0 |
|   | 19 | 21 | 22 | 24 | 25 | 26 | 28 | 29 | 30 | 31 | 0 | 1 | 0 | 1 | 2 | 3 |
| 15 | 0,0 | 0,0 | 0,0 | 0,0 | 0,0 | 0,0 | 0,0 | 0,0 | 0,0 | 0,0 | 0,0 | 0,1 | 1,0 | 1,0 | 1,0 | 1,0 |
|   | 19 | 21 | 22 | 23 | 25 | 26 | 27 | 28 | 29 | 30 | 31 | 0 | 0 | 0 | 1 | 2 |

The initial interpolation interval $\tau_S$ computed by ZPR B163 is used to calculate the first interpolated sample just past the reference sample (i.e., the interpolated sample between the 10th and 11th sample in the above example, assuming $\tau_S$ has not wrapped). Thus, acquisition for ITR is delayed until the reference sample (10th sample) reaches the (N/2)+1 delay register in the delay line of the interpolation filter B122. Referring to the interpolation filter shown in FIG. 6, the first interpolated sample B102 is generated when the reference sample reaches the 4th delay register of delay line B250. Note that the initial interpolation interval $\tau_S$ computed by ZPR B163 is fed forward around the discrete equalizing filter 26 to the modulo-Ts accumulator B120 of FIG. 4B. Thus, the delay in generating the first interpolated sample using the initial τ should be determined with reference to the phase delay of the discrete equalizer.

The latency of the discrete equalizer filter allows ZPR to use more samples in the DFT phase estimate, and/or it allows for more pipeline delay in the ZPR calculations. In addition, approximately half of the preamble samples used to calculate the initial interpolation interval $\tau_S$ are also used by the acquisition mode of ITR; in the above example, 16 preamble samples are used to calculate the DFT phase estimate, and acquisition begins with the 10th preamble sample (i.e., with the reference sample).

Feeding τ forward around the discrete equalizer 26, however, requires that the latency of the equalizer be taken into account in the ZPR calculations. The fractional latency of the FIR filter (relative to the sample period) can be accounted for in the above equations by adding it B302 to arc tan(f/g) B290 as shown in FIG. 9. In an alternative embodiment, ZPR B163 operates on the sample values 32 output by the equalizer (see multiplexer B165 of FIG. 4B) so that the FIR latency does not affect the ZPR calculations. In the preferred embodiment, the discrete equalizer 26 is designed so that its phase delay is constrained to an integer number of sample periods at the preamble frequency. In this manner, the fractional part of the FIR latency is zero; that is, the FIR latency can be ignored in computing τ and $w_O$.

In any event, when performing the ZPR calculations on the unequalized sample values 25, the initial quadrant Q determined by equation (26) must be adjusted by adding (modulo 4) the integer delay of the equalizer, $$Q = (\hat{Q} + \Delta Q + Q\_latency) \bmod 4. \quad (27)$$

Equation (27) is implemented by a modulo 4 adder B298 shown in FIG. 9. Because there are other latencies associated with pipelined calculations in the read channel, the actual latency adjustment to the initial quadrant Q is determined by analyzing all pertinent delays, or simply by trial and error. Thus, the Q_latency B304 added B298 into equation (27) accounts for the integer delay associated with the FIR filter 26 as well as other pipelining delays in the read channel.

The objects of the invention have been fully realized through the embodiments disclosed herein. Those skilled in the art will appreciate that the various aspects of the invention can be achieved through different embodiments without departing from the essential function. The examples provided above are not limiting in the sense that the law allows an interpretation extending to the boundaries of the prior art. The scope of the present invention should, therefore, be determined with respect to the limitations set forth in the claims that follow.

We claim:

1. A sampled amplitude read channel for detecting data stored on a storage medium by sampling pulses in an analog read signal emanating from a read head positioned over the medium, comprising:

(a) a sampling device for asynchronously sampling the analog read signal to generate a sequence of discrete time, asynchronous sample values;

(b) interpolated timing recovery for generating a sequence of substantially synchronous sample values from the asynchronous sample values using an interpolation interval computed relative to a difference between the asynchronous sample values and synchronous sample values;

(c) a zero phase restart circuit, responsive to the asynchronous sample values, for computing an initial interpolation interval at a beginning of an acquisition mode; and (d) a discrete time sequence detector for detecting the data from the substantially synchronous sample values, wherein the zero phase restart circuit comprises a processor for computing a sampling phase offset using a predetermined number of the asynchronous sample values, and the processor computes a real and imaginary component of the asynchronous sample values in the frequency domain.

2. The sampled amplitude read channel as recited in claim 1, wherein the processor computes an arc tangent.

3. The sampled amplitude read channel as recited in claim 2, wherein the arc tangent is computed according to a lookup table.

4. The sampled amplitude read channel as recited in claim 1, further comprising an expected sample value generator for generating expected sample values during the acquisition mode.

5. The sampled amplitude read channel as recited in claim 4, wherein the zero phase restart circuit initializes the expected sample value generator at the beginning of the acquisition mode.

6. The sampled amplitude read channel as recited in claim 5, wherein the zero phase restart circuit comprises a processor for computing a phase quadrant for a predetermined one of the asynchronous sample values.

7. A sampled amplitude read channel for detecting data stored on a storage medium by sampling pulses in an analog read signal emanating from a read head positioned over the medium, comprising:

(a) a sampling device for sampling the analog read signal to generate a sequence of discrete time sample values;

(b) timing recovery for extracting timing information from the discrete time sample values;

(c) a zero phase restart circuit for computing an initial phase offset between a reference sample and an expected sample at a beginning of an acquisition mode, the initial phase offset computed using more than four of the discrete time sample values; and (d) a discrete time sequence detector for detecting the data from the discrete time sample values.

8. The sampled amplitude read channel as recited in claim 7, wherein the processor computes a real and imaginary component of the discrete time sample values in the frequency domain.

9. The sampled amplitude read channel as recited in claim 8, wherein the processor computes an arc tangent.

10. The sampled amplitude read channel as recited in claim 9, wherein the arc tangent is computed according to a lookup table.

11. The sampled amplitude read channel as recited in claim 7, further comprising an expected sample value generator for generating expected sample values during the acquisition mode.

12. The sampled amplitude read channel as recited in claim 11, wherein the zero phase restart circuit initializes the expected sample value generator at the beginning of the acquisition mode.

13. The sampled amplitude read channel as recited in claim 11, wherein the zero phase restart circuit comprises a processor for computing a phase quadrant of the reference sample value.

14. A sampled amplitude read channel for detecting data stored on a storage medium by sampling pulses in an analog read signal emanating from a read head positioned over the medium, comprising:

(a) a sampling device for sampling the analog read signal to generate a sequence of discrete time sample values;

(b) timing recovery for extracting timing information from the discrete time sample values;

(c) a zero phase restart circuit for computing an initial phase offset between a reference sample and an expected sample by computing a discrete fourier transform using a predetermined number of the discrete time sample values; and (d) a discrete time sequence detector for detecting the data from the discrete time sample values.

15. The sampled amplitude read channel as recited in claim 14, wherein the predetermined number of sample values for computing the discrete fourier transform is greater than four.

* * * * *